(12) United States Patent
Mamidi et al.

(10) Patent No.: US 8,352,429 B1
(45) Date of Patent: Jan. 8, 2013

(54) SYSTEMS AND METHODS FOR MANAGING PORTIONS OF FILES IN MULTI-TIER STORAGE SYSTEMS

(75) Inventors: Murthy V. Mamidi, San Jose, CA (US); Raghupathi Malige, San Jose, CA (US); Gautham Ravi, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 302 days.

(21) Appl. No.: 12/551,221

(22) Filed: Aug. 31, 2009

(51) Int. Cl.
  *G06F 17/30* (2006.01)
  *G06F 17/00* (2006.01)

(52) U.S. Cl. ............ 707/640; 707/641; 707/642; 711/5

(58) Field of Classification Search .......... 707/640–642; 711/5; 710/5, 15
See application file for complete search history.

(56) References Cited

U.S. PATENT DOCUMENTS

| | | | |
|---|---|---|---|
| 6,122,640 A * | 9/2000 | Pereira .................... | 707/648 |
| 6,269,382 B1 * | 7/2001 | Cabrera et al. ........... | 1/1 |
| 6,330,621 B1 * | 12/2001 | Bakke et al. ............. | 710/5 |
| 6,678,752 B1 * | 1/2004 | Ashton et al. ............ | 710/15 |
| 6,718,427 B1 * | 4/2004 | Carlson et al. ........... | 711/5 |
| 7,251,661 B1 * | 7/2007 | Reed et al. .............. | 1/1 |
| 7,509,316 B2 * | 3/2009 | Greenblatt et al. ....... | 1/1 |
| 7,546,324 B2 * | 6/2009 | Prahlad et al. ........... | 1/1 |

OTHER PUBLICATIONS

Sybase administrative guide. 1996.*
Karche, Ganesh et al.; "Using Dynamic Storage Tiering;" Symantec Yellow Books; 2006; Symantec Corporation; CA.

* cited by examiner

*Primary Examiner* — Yicun Wu
(74) *Attorney, Agent, or Firm* — Advantedge Law Group

(57) ABSTRACT

The present disclosure presents a method for managing portions of files in multi-tier storage systems. The method may include identifying a file that is managed by an application and stored in a multi-tier storage system. The method may also include determining how the application stores data in the file by identifying data-management information associated with the application. The method may further include using the data-management information to identify a first portion of the file, identifying a data-placement policy, and implementing the data-placement policy by moving the first portion of the file from a first tier of the multi-tier storage system to a second tier of the multi-tier storage system. Various other methods, systems, and computer-readable media are also disclosed.

20 Claims, 8 Drawing Sheets

SYSTEMS AND METHODS FOR MANAGING PORTIONS OF FILES IN MULTI-TIER STORAGE SYSTEMS

BACKGROUND

Many commercial databases and applications store their data in files. The file systems they use are unusual because they typically contain relatively small numbers of large files with long lifetimes. A database may be divided into one or more logical storage units called table spaces, and a table space may contain logical entities, such as tables and indexes. A table space may be stored in one or more physical data files. Thus, a database may store data logically in table spaces and physically in data files associated with a corresponding table space.

Table spaces may further be divided into logical units referred to as segments, which may be divided into database extents. Database extents may include a collection of continuous blocks in a data file. For tables, storage space may be allocated on demand as new rows are inserted into a table, and a database may spread tables across one or more data files by allocating database extents from different data files each time rows are inserted into a table. Thus, a data file may include database extents of multiple tables, and a table may include database extents from multiple data files. These data files are typically large in size, and portions of the files are randomly accessed. Accordingly, some portions of a database file may be accessed infrequently, remaining untouched or cold for extended periods of time (or during the entire life cycle of the database file).

In current storage management and file relocation solutions, a whole database file may be relocated based on the I/O activity of the entire file. As a result, several table database extents belonging to multiple tables may be relocated to the same storage location (e.g., a lower quality of service storage location), even if some of the database extents are accessed frequently and others are accessed infrequently. Such relocation may adversely impact not only performance for one or more tables of a database, but also the optimization of storage utilization.

SUMMARY

As will be described in greater detail below, the instant disclosure generally relates to systems and methods for managing portions of files in multi-tier storage systems. In some embodiments, a method may include identifying a file that is managed by an application and stored in a multi-tier storage system, determining how the application stores data in the file by identifying data-management information associated with the application, and using the data-management information to identify a first portion of the file. The method may also include identifying a data-placement policy and implementing the data-placement policy by moving the first portion of the file from a first tier of the multi-tier storage system to a second tier of the multi-tier storage system without the application being aware of the change.

In some embodiments, the application may include a database application and the first portion of the file may include a database extent of the file. In various embodiments, the database extent may include data of a database table space and database extents of the database table space may be stored in a plurality of files. According to certain embodiments, moving the first portion of the file may include translating the database extent to file system block offset and length pairs and then using the file system block offset and length pairs to move file system blocks of the database extent.

According to at least one embodiment, the data-placement policy may indicate that the first portion of the file has higher priority than a second portion of the file and the second tier of the multi-tier storage system may provide a higher quality of service than the first tier of the multi-tier storage system. In various embodiments, the method may include determining that the first portion of the file has higher priority than the second portion of the file by tracking input-output activity of the file and determining which portions of the file have higher input-output activity than other portions of the file. The method may additionally or alternatively include receiving user input indicating that the first portion of the file has higher priority than the second portion of the file.

In certain embodiments, the method may include tracking input-output activity of the first portion of the file. In such embodiments, the data-placement policy may include an input-output threshold and implementing the data-placement policy may include determining that the input-output activity of the first portion of the file exceeds the input-output threshold. Implementing the data-placement policy may also include moving the first portion of the file in response to the determination that the input-output activity of the first portion of the file exceeds the input-output threshold.

The method may additionally or alternatively include providing a report of the input-output activity of the first portion of the file and using the report of the input-output activity to set the input-output threshold. The method may further include tracking input-output activity of the first portion of the file. In such embodiments, the first portion of the file may include a file system extent of the file and the input-output activity of the first portion of the file may be associated with start and offset information that identify the first portion of the file.

According to various embodiments, the file may include data of a call detail record table, the call detail record table may be partitioned, and moving the portion of the file may include moving a partition of the call detail record table from the first tier of the multi-tier storage system to the second tier of the multi-tier storage system. Additionally or alternatively, the portion of the file may include a database extent of a call detail record table. In such embodiments, moving the portion of the file may include using database extent and segment dictionary tables to generate file, offset, and length information of the extent and using the file, offset, and length information to move the portion of the file from the first tier of the multi-tier storage system to the second tier of the multi-tier storage system.

In some embodiments, the multi-tier storage system may include a multi-device file system, the multi-device file system may abstract a set of volumes as a single device, the first tier of the multi-tier storage system may include a first subset of volumes from the set of volumes, and the second tier of the multi-tier storage system may include a second subset of volumes from the set of volumes.

According to certain embodiments, a system may include at least one processor, a multi-tier storage system, and an identification module programmed to direct the processor to identify a file that is managed by an application and stored in the multi-tier storage system. The identification module may also direct the processor to determine how the application stores data in the file by identifying data-management information associated with the application. The identification module may further use the data-management information to identify a first portion of the file. The system may also include a relocation module programmed to identify a data-placement policy and implement the data-placement policy by moving the first portion of the file from a first tier of the multi-tier storage system to a second tier of the multi-tier storage system.

In certain embodiments, the application may include a database application, the first portion of the file may include a database extent of the file, the database extent may include data of a database table space, and database extents of the database table space may be stored in a plurality of files. According to various embodiments, the data-placement policy may indicate that the first portion of the file has higher priority than a second portion of the file and the second tier of the multi-tier storage system may provide a higher quality of service than the first tier of the multi-tier storage system.

The system may further include a tracking module programmed to track input-output activity of the first portion of the file. In such embodiments, the data-placement policy may include an input-output threshold and implementing the data-placement policy may include determining that the input-output activity of the first portion of the file exceeds the input-output threshold. Implementing the data-placement policy may also include moving the first portion of the file in response to the determination that the input-output activity of the first portion of the file exceeds the input-output threshold.

In certain embodiments, a computer-readable-storage medium may include one or more computer-executable instructions that, when executed by a computing device, cause the computing device to: 1) identify a file that is managed by an application and stored in a multi-tier storage system, 2) determine how the application stores data in the file by identifying data-management information associated with the application, 3) use the data-management information to identify a first portion of the file, identify a data-placement policy, and 4) implement the data-placement policy by moving the first portion of the file from a first tier of the multi-tier storage system to a second tier of the multi-tier storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
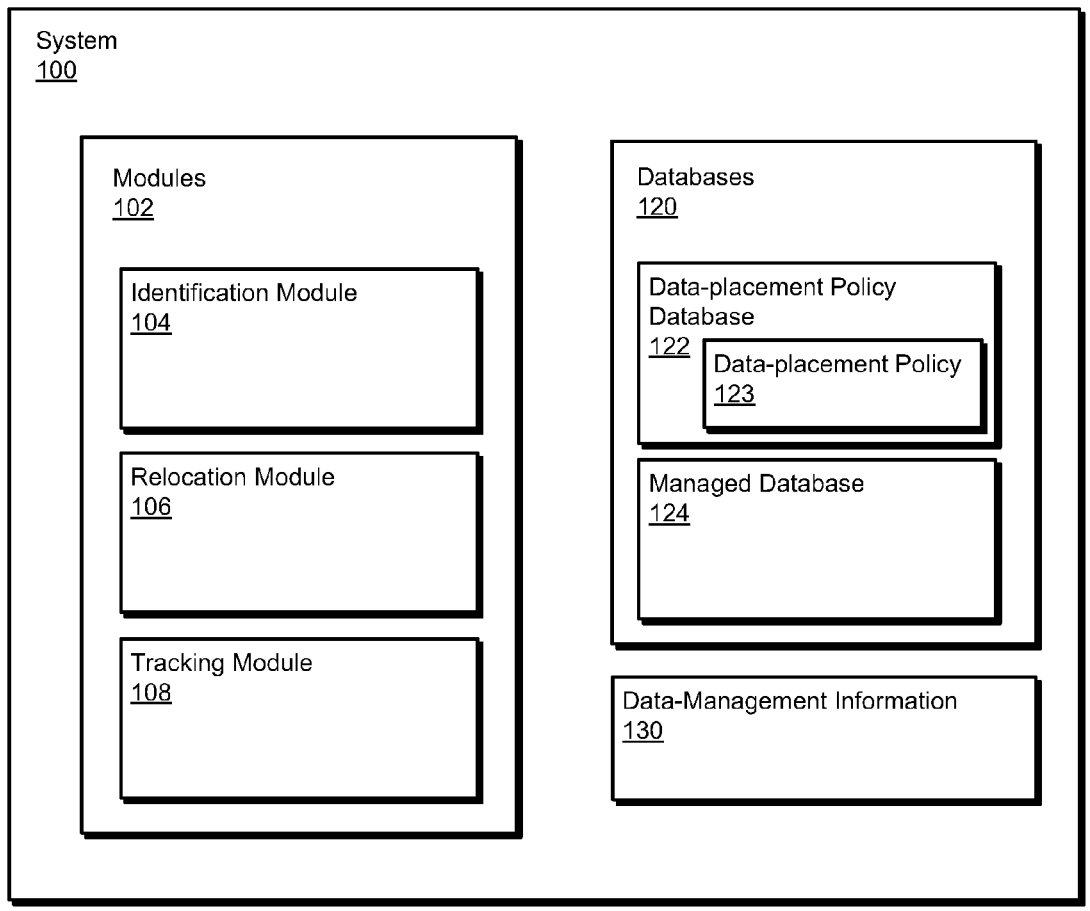
FIG. 1 is a block diagram of an exemplary system for managing portions of files in multi-tier storage systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for managing portions of files in multi-tier storage systems. Embodiments of the instant disclosure may be implemented using dynamic storage tiering. Dynamic storage tiering may enable the use of different storage devices having different qualities of service within a single file system (i.e., a multi-device file system).

A multi-device file system may utilize a multi-volume set feature of a volume manager. A multi-volume set may abstract multiple volumes into a single device for use with a file system, while each individual volume may be built out of storage of a given quality of service. Embodiments of the instant disclosure may facilitate establishment of data placement policies such that more frequently used or more important portions of data files may be placed in storage with higher quality of service while other data may be placed in storage with lower quality of service. Embodiments of the instant disclosure may also facilitate migration of data from portions of files among tiers when a characteristic, such as an I/O characteristic, of a portion of a file changes over time.

Embodiments of the instant disclosure may provide various advantages over traditional data relocation systems by relocating portions of files to facilitate optimization of storage cost and performance and/or for other technical or business purposes. Embodiments of the instant disclosure may also provide various other features and advantages, as will be discussed in greater detail below.

Figure 2:
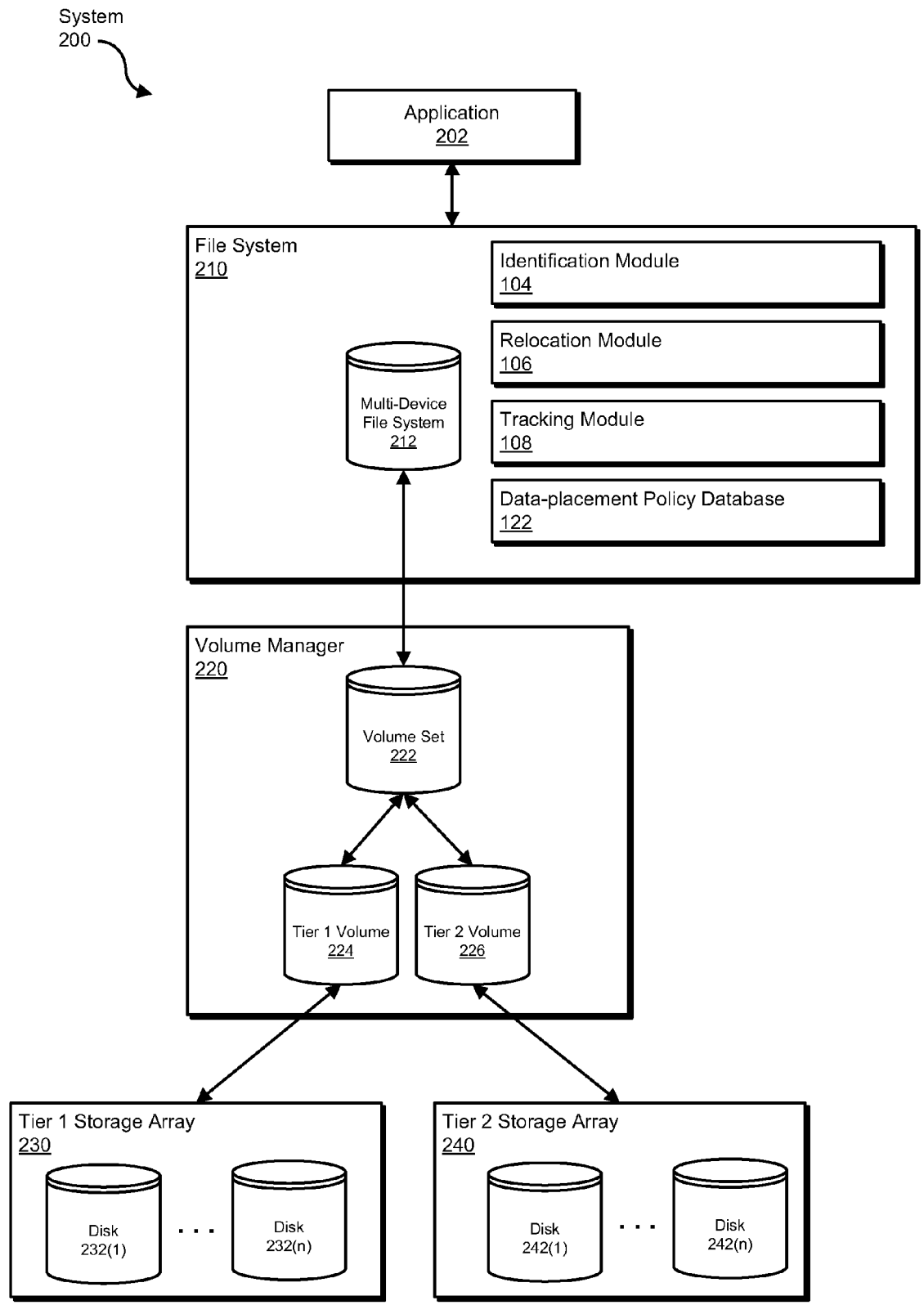
FIG. 2 is a block diagram of an exemplary system for managing portions of files in multi-tier storage systems.

The following will provide, with reference to FIGS. 1-2, detailed descriptions of exemplary systems for managing portions of files in multi-tier storage systems. Detailed descriptions of corresponding computer-implemented methods will also be provided in connection with FIGS. 3-5. Detailed descriptions of an exemplary multi-tier storage system for databases are described in connection with FIG. 6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for managing portions of files in multi-tier storage systems. As illustrated in this figure, exemplary system 100 may include one or more modules 102 for performing one or more tasks. For example, and as will be explained in greater detail below, exemplary system 100 may include an identification module 104 programmed to identify a file that is managed by an application and stored in a multi-tier storage system, determine how the application stores data in the file by identifying data-management information associated with the application, and use the data-management information to identify a first portion of the file.

Exemplary system 100 may also include a relocation module 106 programmed to identify a data-placement policy and implement the data-placement policy by moving the first portion of the file from a first tier of the multi-tier storage system to a second tier of the multi-tier storage system. In addition, and as will be described in greater detail below, exemplary system 100 may include a tracking module 108 programmed to track input-output activity of the first portion of the file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the computing system 710 in FIG. 7 and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a data-placement policy database 122 for storing one or more data-placement policies, such as data-placement policy 123, for portions of files. In some embodiments, system 100 may include a managed database 124, which may store data managed by a database application.

Databases 120 in FIG. 1 may represent a portion of one or more computing devices. For example, databases 120 may represent a portion of computing system 710 in FIG. 7 and/or portions of exemplary network architecture 800 in FIG. 8. Alternatively, databases 120 in FIG. 1 may represent one or more physically separate devices capable of being accessed by a computing device, such as computing system 710 in FIG. 7 and/or portions of exemplary network architecture 800 in FIG. 8.

System 100 may also include data-management information 130. Data-management information 130 may provide information on how an application stores data within a file, as described in greater detail below. Data-management information 130 may be provided in a database, included within relocation module 106, created on-the-fly, and/or provided in any other suitable manner.

Exemplary system 100 in FIG. 1 may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In some embodiments, exemplary system 100 may be deployed as a multi-tier storage system, such as system 200 in FIG. 2. As shown in FIG. 2, system 200 may include an application 202 in communication with a file system 210. File system 210 may include a multi-device file system 212, identification module 104, relocation module 106, tracking module 108, and data-placement policy database 122. Multi-device file system 212 may enable multi-tier storage. Multi-tier storage generally refers to the use of virtual or physical storage devices with different characteristics to provide differentiated storage for computing systems. For example, storage devices in a multi-device file system may have different Input/Output ("I/O") performance, data availability, and/or relative cost characteristics.

Storage system 200 may provide support for multi-volume file systems through multi-device file system 212 and may provide automatic policy-based placement of portions of files within file system 210 through modules 104, 106, and 108 and data-placement policy database 122. Multi-volume file systems, as the name implies, may include file systems that occupy two or more virtual storage volumes. A multi-volume file system may present a single name space, making the existence of multiple volumes transparent to users and applications while maintaining awareness of each volume's identity, making it possible to control the locations at which portions of files are stored. In some embodiments, all files in such a file system may be part of the same name space and accessed and manipulated as though they occupy a single volume.

System 200 may also include a volume manager 220. Volume manager 220 may implement software-based virtualization for facilitating multi-tier storage in the form of virtual volumes configured from multiple hardware devices. Volume manager 220 may include a volume set 222. As used herein the phrase "volume set" generally refers to the volumes on which a file system in constructed. Volume set 222 may be divided into a tier 1 volume 224 and a tier 2 volume 226. For example, tier 1 volume 224 may include tier 1 storage array 230 (i.e., disk 232(1) through disk 232(n)). Similarly, tier 2 volume 226 may include a tier 2 storage array 240 (i.e., disk 242(1) through disk 242 (n)).

Volume set 222 may be configured in a variety of manners. For example, tier 1 volume 224 and/or tier 2 volume 226 may be configured from enterprise disk array Logical Unit Number units ("LUNS"), mid-range disk array LUNS, and/or disks connected directly to their host systems. Tier 1 volume 224 and/or tier 2 volume 226 may also represent more complex configurations, such as mirrored volumes configured from RAID-5 LUNS presented by two disk arrays.

Volume set 222 may represent a single dimensional storage hierarchy (i.e., a storage hierarchy where better quality storage costs more). In other embodiments, volume set 222 may represent a multi-dimensional storage hierarchy. In such embodiments, storage performance may be influenced by hardware cost and configuration. Storage tiers created from physically similar components may also have significantly different costs based on the functionality they provide. For example, a tier of storage may be configured to take periodic full-sized snapshots or to replicate itself remotely, while another utilizing the same basic hardware components may not. As another example, while more expensive devices may outperform less expensive devices, virtual volumes with more columns (e.g., separate disks or LUNS) tend to outperform volumes with fewer columns, and thus the cost per usable byte of the two may be equal.

As a third example, mirrored, RAID-5, and striped LUNS or volumes of equivalent capacity may form an available hierarchy, with higher availability costing more. Additionally or alternatively, mirrored, RAID-5, and striped volumes may have different widths, or numbers of columns, resulting in different performance characteristics and differences in failure protection.

Multi-tier storage systems, such as system 200, may provide optimized placement of portions of files based on one or more of a variety of criteria. For example, system 200 may optimize placement of portions of files based on actual access patterns, based on expected access patterns, access times, to improve load balancing, to optimize data availability, to provide flexibility for data protection, and/or for a variety of other reasons.

As noted, file portion relocation may be based on access patterns of file portions. In such embodiments, I/O activity for one or more portions of files may be monitored and relocation may be based on the intensity with which a portion of a file is accessed. Additionally or alternatively, multi-tier storage systems may be implemented to maximize efficiency based on expected access patterns. For example, different portions of files may have different I/O performance needs. High data transfer performance may be important for some portions of a file, but less important for other portions of the file.

In some embodiments, file portion placement may be based on how recently a portion of a file was accessed. For example, if a first portion of a file was accessed more recently than a second portion of the file, the first portion of the file may be placed on a higher quality of service storage than the second portion of the file.

A multi-tier storage system may also improve load balancing among portions of a file. For example, a file may include numerous database extents of a database that are accessed frequently. If such a file is located on a single storage device, the storage device may be overburdened with I/O requests. Multi-tier storage may be implemented to improve I/O response time of such a file by dividing the file among multiple storage devices.

Multi-tier storage systems may further be used to optimize data availability. For example, some portions of a file may be critical and may need to be available continually, while other portions of the file may not be affected by downtime. As an example, a portion of a database file may contain point-of-sale or customer relationship management data, which may be critical for day-to-day operations, while another portion of the database file may include human resources data that may not be as critical. Multi-tier data systems presented herein may store such database data on different devices, with the point-of-sale and customer relationship management data being stored on higher availability devices than the human resources data.

Multi-tier storage systems disclosed herein may also provide more flexibility for data protection of portions of a file. Different data sets within a single file may have different commercial value. For example, a single file may include daily business transactions as well as quarterly and annual closing figures. Losing a day's business transactions may be significant, but survivable to an enterprise. Losing quarterly or annual closing figures, on the other hand, might be catastrophic. Embodiments of the instant disclosure may store portions of the file that contain quarterly and annual closing figures on highly protected storage devices while storing portions of the file that contain daily business transactions on less protected (e.g., less frequently backed up) storage devices.

Multi-tier storage systems of the instant disclosure may also be implemented for various other general business purposes. For example, enterprise accounting, security, and regulatory compliance policies may require that certain storage devices be restricted to containing specific types of data from a database. Thus, a file of a database may be divided up for accounting, security, regulatory, and/or any other business purpose.

Figure 3:
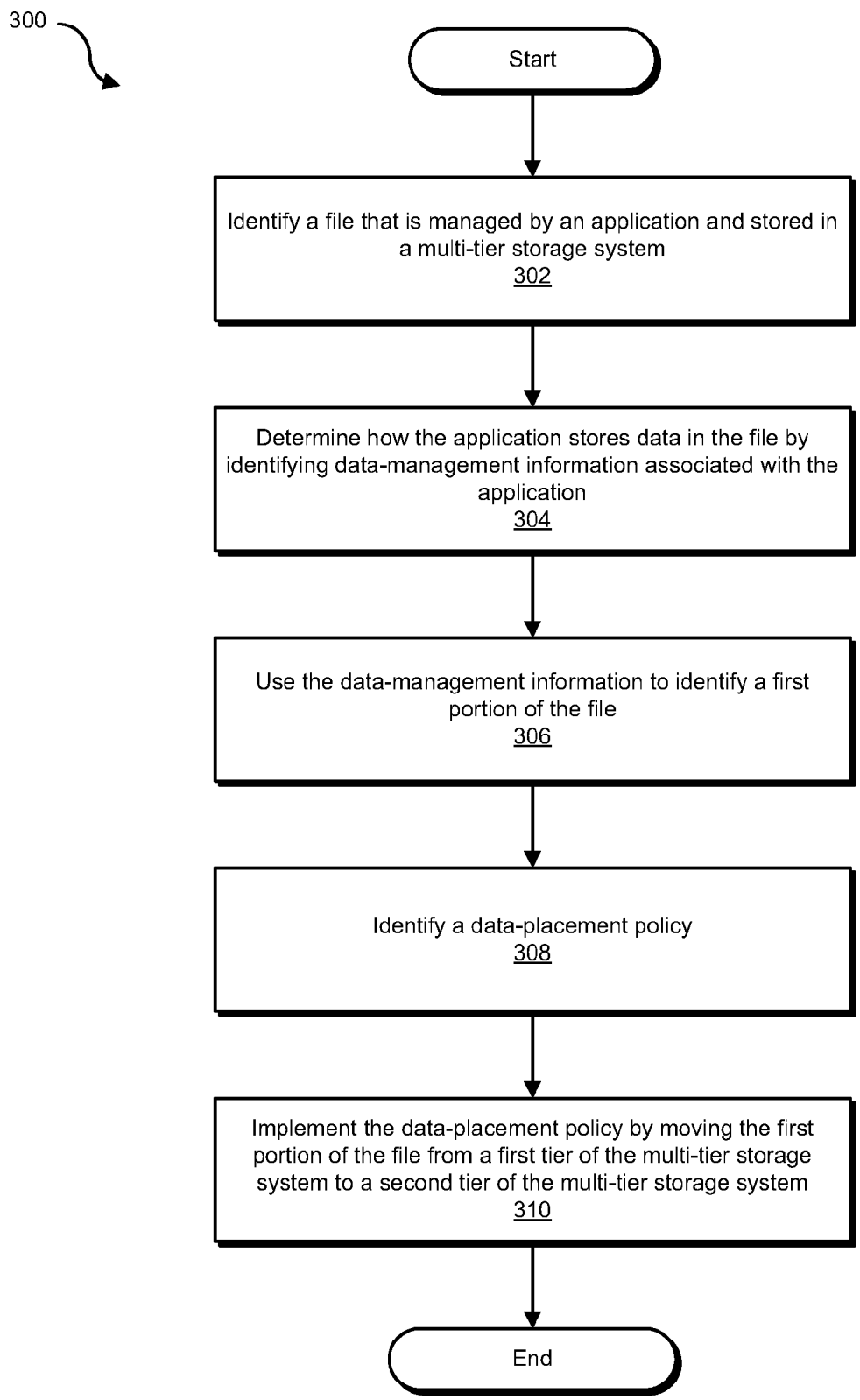
FIG. 3 is a flow diagram of an exemplary method for managing portions of files in multi-tier storage systems.

FIG. 3 is a flow diagram of an exemplary computer-implemented method 300 for managing portions of files in multitier storage systems. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may identify a file that is managed by an application and stored in a multi-tier storage system. For example, identification module 104 in FIG. 1 (which may, as detailed above, be included in file system 210 in FIG. 2) may identify a file managed by application 202 and stored in multi-device file system 212. The file may be identified at a variety of times and in a variety of ways. For example, the file may be identified during a process of rearranging portions of the file within a multi-tier storage environment. In some embodiments, the file may be identified as part of a regularly scheduled data organization task. Additionally or alternatively, the file may be identified in response to one or more other triggers, such as a significant change in I/O access patterns to portions of the file and/or any other performance or business-related event.

As noted, the file may be managed by an application. As used herein, the phrase "managed by an application" generally refers to an application accessing, reading to, writing to, or otherwise using a file. Files may be managed by one or more of various types of applications. For example, as discussed in greater detail below, a file may be managed by a database application. Files may also be managed by other types of applications, such as e-mail applications, office applications (e.g., spreadsheets, word processors, etc.), and/or any other type of application capable of accessing data in a file.

At step 304, one or more of the systems described herein may determine how the application stores data in the file by identifying data-management information associated with the application. For example, identification module 104 may determine how application 202 stores data in a file by identifying data-management information associated with application 202. By identifying how application 202 stores data in files, identification module 104 may enable relocation module 106 to access a portion of the file and relocate the portion of the file.

Data-management information may be identified in a variety of manners. In some embodiments, identification module 104 may be programmed to work with a variety of different applications and may first determine which application manages the file. After determining which application manages the file, identification module 104 may identify data-management information associated with the application (e.g., identification module 104 may query a local or remote database). As an example, identification module 104 may determine that application 202 is a database application and may determine that the database application stores data within file system extents of a file. Alternatively, identification module 104 may be specifically programmed to identify files associated with a particular application or type of application. In such embodiments, identification module 104 may not need to determine which application manages the file. The data-management information may be included within identification module 104, and identification module 104 may identify data-management information by executing a process that uses data-management information as a parameter. In other embodiments, identification module 104 may identify data-management information by analyzing a file to determine how the file is sub-divided and/or by analyzing how an application writes to a file.

As used herein, the phrase "data-management information" generally refers to any information that indicates how an application stores data within a file. In some embodiments, data-management information may identify subdivisions of a file used by an application. For example, data-management information may indicate that an application breaks data up within a file in one or more extents of the file.

At step 306, one or more of the systems described herein may use the data-management information to identify a first portion of the file. For example, identification module 104 may use the data-management information identified in step 304 to identify an extent of a database file. As used herein, the phrase "portion of a file" generally refers to any subdivision of a file, including extents, byte ranges, and/or any other data ranges or subdivisions of a file. As used herein, the term "extent" generally refers to any contiguous area of storage within a file system.

At step 308, one or more of the systems described herein may identify a data-placement policy associated with the first portion of the file. For example, relocation module 106 may identify data placement policy 123 stored in data-placement policy database 122. A data placement policy may also be identified in any other suitable way.

Data placement policies may be administered either directly on the system to which they apply or centrally for an entire data center or enterprise. For example, relocation module 106 and/or one or more of the other modules described herein may be part of a client-server suite for consolidated management of storage on multiple platforms. For systems with such functionality installed and enabled, data placement policies may be stored in data-placement policy database 122 and may be associated with portions of files.

Data placement policies may define circumstances under which portions of files should be relocated. In some embodiments, data placement policies may be expressed in a set of internal data structures of a file system that defines desired placement of portions of files on volumes that comprise a volume set of the file system. For example, a data placement policy may provide rules that restrict locations of portions of files to administrator-defined subsets of volumes in a file system's volume set. These subsets may be referred to as placement classes. A placement class may typically be identified with a storage tier. Policy rules may cause portions of files to be placed within specified placement classes and/or to be relocated to other placement classes when they meet certain qualifications.

As noted, data placement policies may specify where portions of files should be placed in terms of placement classes rather than specific volumes. Thus, it may be unnecessary to change a file system's placement policies when volumes are added to or removed from its volume set. Moreover, in some embodiments, because volume tags that define placement classes need not be unique, one placement policy may be used for any number of file systems with similar requirements and storage compliments.

In some embodiments, data placement policies may specify relocation destinations as priority-ordered lists of placement classes. Files may be relocated to a first placement class in the list if free space permits, to the second class if no free space is available on first, and so forth.

Data-placement policies may define data-placement for portions of files based on one or more of actual access patterns of file portions, based on expected access patterns of file portions, based on access times of file portions, to improve load balancing among portions of a file, to optimize data availability of portions of a file, to provide flexibility for data protection of file portions, and/or for a variety of other criteria.

In some embodiments, actual access patters of portions of a file may be defined as file portion I/O temperatures. I/O temperatures may be calculated as the number of bytes transferred to or from a portion of a file over a specified period of time divided by the size of the portion of the file. For example, if a portion of a file occupies 1 MB of storage at the time of policy enforcement, and the data in it has been completely read or written 15 times within the last three days, its three-day average I/O temperature may be 5 (15 MB of I/O divided by 1 MB file size divided by three days).

Similarly, a file portion's average access temperature may include the number of read or write requests made to it over a specified number of 24-hour periods divided by the number of periods. Unlike I/O temperature, access temperature may be unrelated to file portion size; a large portion of a file to which 20 I/O requests are made over a two-day period has the same average access temperature as a small portion of a file accessed 20 times over a two-day period. The periods for determining a file portion's average access temperature and/or I/O temperature may be any time period, including one or more minutes, hours, days, etc.

Some data-placement policies may define data placement based on thresholds for age-based access. Such policies may use file access age (e.g., time since last access) to qualify portions of files for downward relocation within a storage hierarchy. Thus, portions of files with larger access ages may be relocated to lower tiers.

In some embodiments, data relocation may be based on modification age. Such policies may use a modification age of a portion of a file (e.g., time since last modification) to qualify file portions for both downward and upward relocation within a storage hierarchy. A file portion with a larger modification age may be relocated to lower storage tiers; a file portion with a smaller modification age may be relocated upward.

Data placement policies may also define relative priority. For example relocation module 106 may determine that a first portion of a file has higher priority than a second portion of the file. A data-placement policy may indicate that if a first portion of the file has higher priority than a second portion of the file, the first portion of the file should be stored on a higher quality of service storage tier than the first portion of the file. Priority may be defined based on any of the file characteristics described herein and/or on any other characteristic.

Returning to FIG. 3, at step 310 relocation module 106 may implement the data-placement policy by moving a portion of the file from a first tier of the multi-tier storage system to a second tier of the multi-tier storage system. Portions of files may be moved in a variety of ways. For example, file portion relocation may be performed either on-demand or periodically. In some embodiments, portions of files may be relocated to a second tier (e.g., a first placement class listed in a rule) if space is available, to a third tier (e.g., a second class if no space is available in the first) of storage, and so forth. In some embodiments, relocation module 106 may move a portion of a file by translating a file's extent to file system block offset and length pairs and may use the file system block offset and length pairs to access and relocate file system blocks of the extent.

As used herein, the terms first tier, second tier, and third tier generally refer to different tiers of a multi-tier storage system, but the terms first, second, and third are not necessarily indicators of relative quality of service of the storage tiers. In some embodiments, the first tier may have a higher quality of service than other tiers. Alternatively, the second and/or third tiers may have higher quality of service than other tiers. In some embodiments, the first, second, and third tiers may have similar quality of service but may be distinguished from one another by one or more other characteristics.

Relocation module 106 may implement one or more of the placement policies described herein and/or any other placement policies. As an example, the discussion corresponding to FIGS. 4 and 5 shows how I/O activity placement policies may be used relocate portions of the file.

For many portions of files, particularly database files (as discussed in FIG. 6), both access requirements and value to an enterprise may change over time. For example, newly created transaction records are typically accessed frequently as orders are processed, confirmed, scheduled for shipment, and billed, and as customer inquiries are handled. As these records age, access tends to become less frequent, but the records may nevertheless remain online for occasional inquiries, monthly and quarterly closings, mining, and other ancillary uses. A data center's average storage costs may be reduced substantially by moving portions of a data file to a lower performance, less expensive storage device (i.e., lower quality of service data device) as the file portion ages and is accessed less frequently.

As discussed, one important application of dynamic storage tiering may be automatically relocating inactive files to lower-cost storage (i.e., storage tiers with lower quality of service). FIG. 4 provides an exemplary method 400 of how this may be accomplished. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

Figure 4:
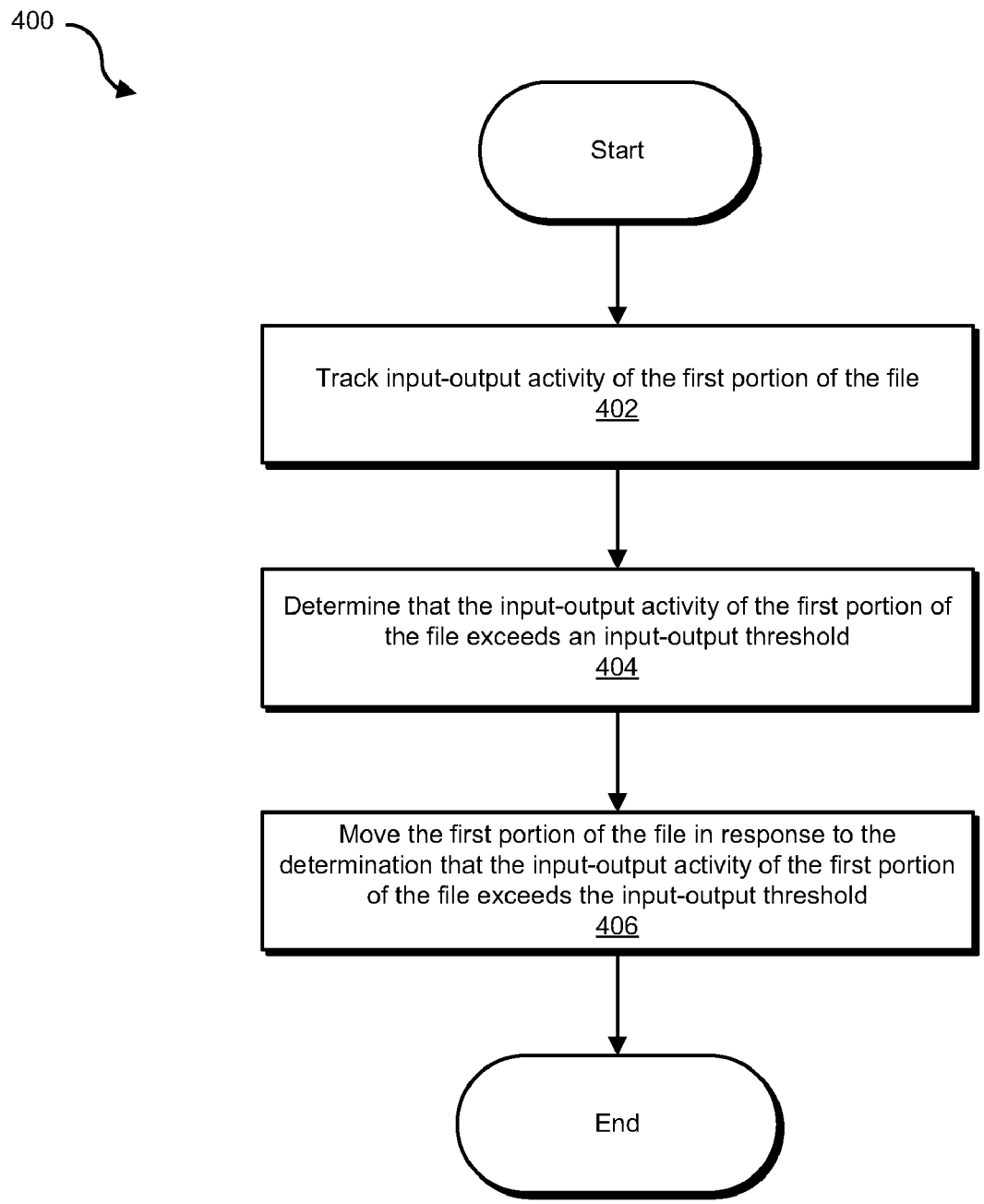
FIG. 4 is another flow diagram of an exemplary method for managing portions of files in multi-tier storage systems.
Figure 5:
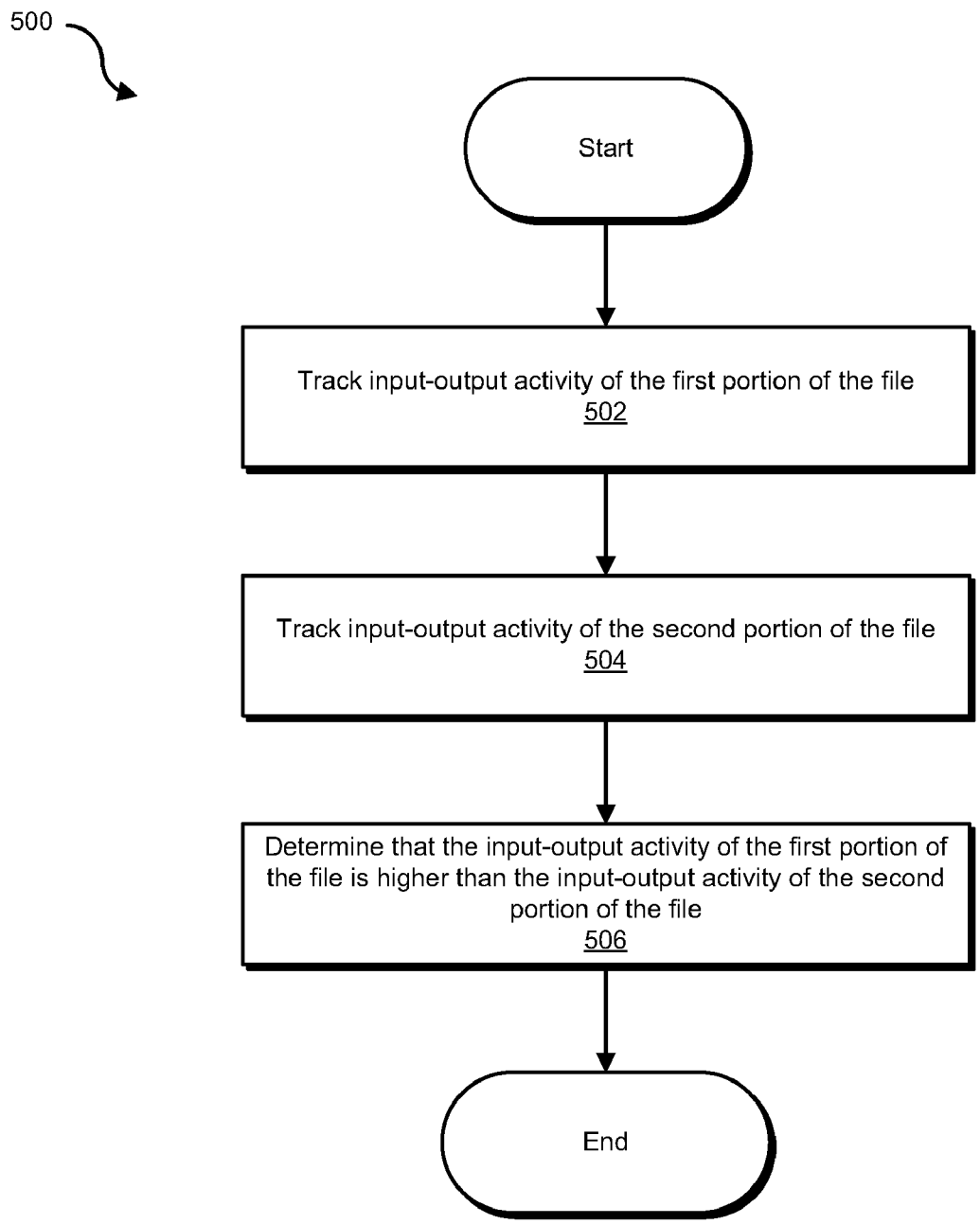
FIG. 5 is another flow diagram of an exemplary method for managing portions of files in multi-tier storage systems.

At step 402 in FIG. 4, one or more of the systems described herein may track input-output activity of the first portion of a file. For example, tracking module 108 in FIG. 1 (which may, as detailed above, be part of file system 210 in FIG. 2) may track I/O activity of a file in multi-device file system 212. Tracking module 108 may track input-output activity of a portion of a file in a variety of ways. For example, tracking module 108 may track input-output activity of a file by tracking reads of a file, writes to a file, and/or any other access of the portion of the file. In some embodiments, tracking module 108 may collect I/O statistics (e.g., I/O temperature and/or access temperature) on a per byte range of a given file. I/O statistics may be collected for one or more extents of a set of files. These statistics may be gathered over a period of time. At the end of the period, these statistics may be saved in a repository. The repository may associate I/O statistics with an inode of a file, a start address of the file, and an offset within the file. The I/O information for portions of a file may be stored permanently or may only be stored temporarily. For example, after the I/O information is used to implement a data-placement policy, the I/O information may be deleted. Thus, the repository of I/O information for each new period may be reset as new statistics are collected.

The I/O activity information tracked for portions of a file may be used in a variety of ways. For example, at step 404 one or more of the systems described herein may determine that the input-output activity of a portion of the file exceeds an input-output threshold. Such a threshold may indicate a predefined level of input-output activity. A data-placement policy may indicate that if input-output activity exceeds the threshold, the file should be located in a higher quality of service storage tier. At step 406, relocation module 106 may move the first portion of the file in response to the determination that the I/O activity of the first portion of the file exceeds the I/O threshold.

FIG. 5 is a flow diagram of an exemplary computer-implemented method 500 for managing portions of files in multi-tier storage systems. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2. At step 502 in FIG. 5, one or more of the systems described herein may track input-output activity of a first portion of a file, and at step 504, one or more of the systems described herein may track input-output activity of a second portion of the file. Steps 502 and 504 are similar to step 402, and the description of processes in step 402 may apply to one or both of steps 502 and 504.

At step 506, one or more of the systems described herein may determine that the input-output activity of the first portion of the file is higher than the input-output activity of the second portion of the file. For example, relocation module 106 may determine that the input-output activity of a first portion of a file in multi-device file system 212 is higher than the input-output activity of the second portion of the same file. Thus, the first portion of the file may be placed at a storage location with a higher quality of service than the second portion of the file (i.e., relative placement rather than absolute placement based on a threshold).

In some embodiments, one or more of the systems described herein may generate a report of input-output activity of the first portion of a file. In some embodiments, the report may be used to automatically set one or one input-output threshold. Additionally or alternatively, the report may provide input-output activity information to an administrator, and the administrator may use the input-output activity information to set an input-output threshold.

Figure 6:
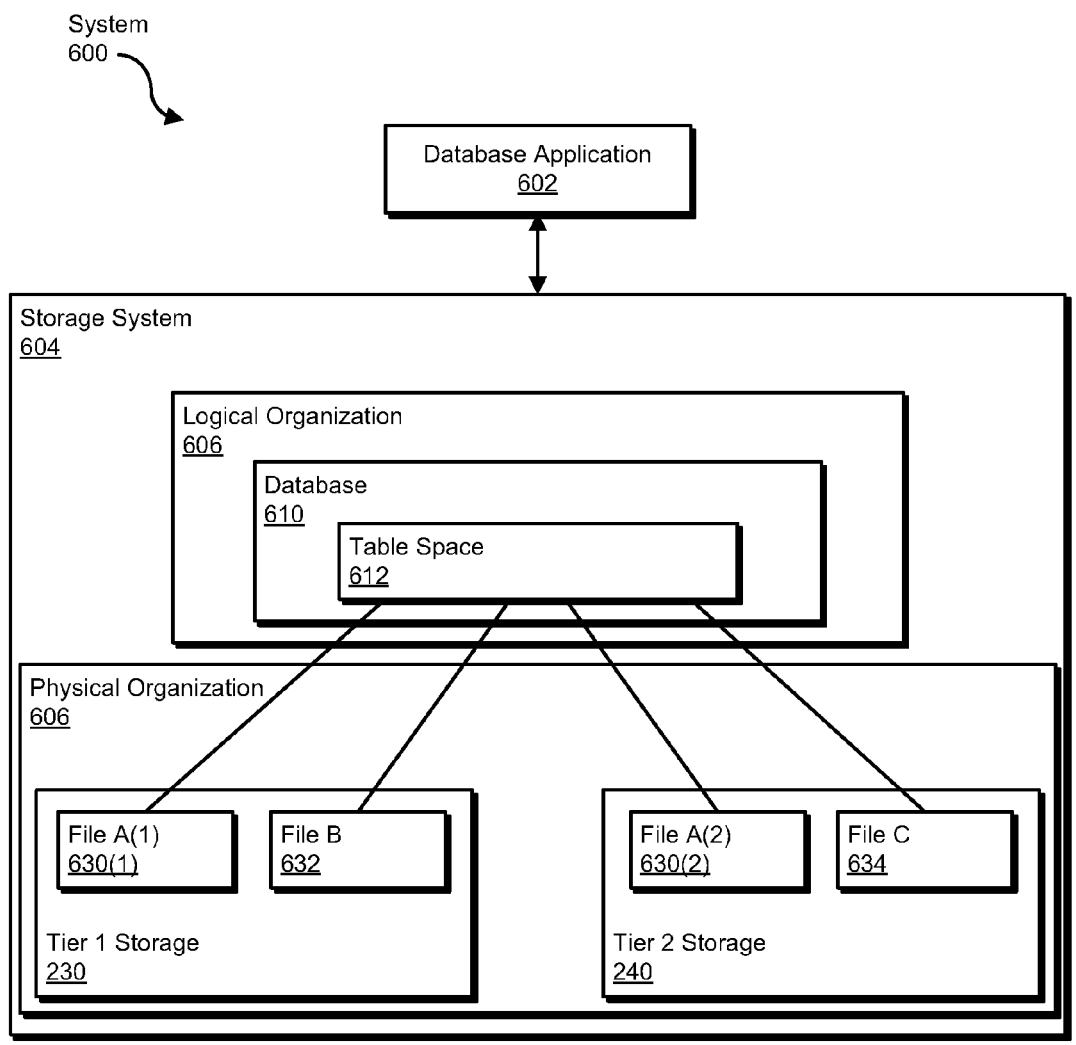
FIG. 6 is a block diagram of an exemplary system for managing portions of database files in multi-tier storage systems.

FIG. 6 shows an exemplary system 600 illustrating a logical organization 606 and a physical organization 608 of a database 610. System 600 may include a database application 602 and a storage system 604. Database application 602 may be any database application, including ORACLE, SQL, MICROSOFT ACCESS, and/or any other application for managing databases.

Storage system 604 may include database 610 with a table space 612. Table space 612 may be any storage location where data objects for a database are stored. A table space may be used to allocate storage for database segments. Database segments may be database objects such as table data and/or indexes. Table space 612 may be stored in one or more physical data files.

FIG. 6 shows that table space 612 may be stored physically in file A (shown in two portions as File A(1) 630(1) and File A(2) 630(2)), file B 632, and/or file C 634. In some embodiments, data of table space 612 may be allocated to file A, file B 632, and file C 634 on an extent-by-extent basis. As previously noted, extents may include a collection of continuous blocks in a data file. Each time new data (e.g., new rows) are added to database 610, additional space in files A, B 632, and/or C 634 may be allocated. Thus, database 610 may spread data across one or more data files by allocating extents from different data files each time.

FIG. 6 shows that physical storage may be divided into tier 1 storage 230 and tier 2 storage 240. Tier 1 storage 230 may contain higher quality of service storage devices than tier 2 storage 240. Storage system 604 may determine that a first portion of file A, represented as file A(1) 630(1), has a higher I/O temperature than a second portion of file A, represented as file A(2) 630(2). Storage system 604 may also include a data-placement policy that indicates file portions with higher I/O temperatures should be located on tier 1 storage 230 and file portions with lower I/O temperatures should be located on tier 2 storage 240. Thus, as shown in FIG. 6, file A 630 may be divided such that file portion A(1) 630(1) is located on tier 1 storage 230 and file portion A(2) 630(2) is located on tier 2 storage 240.

Figure 7:
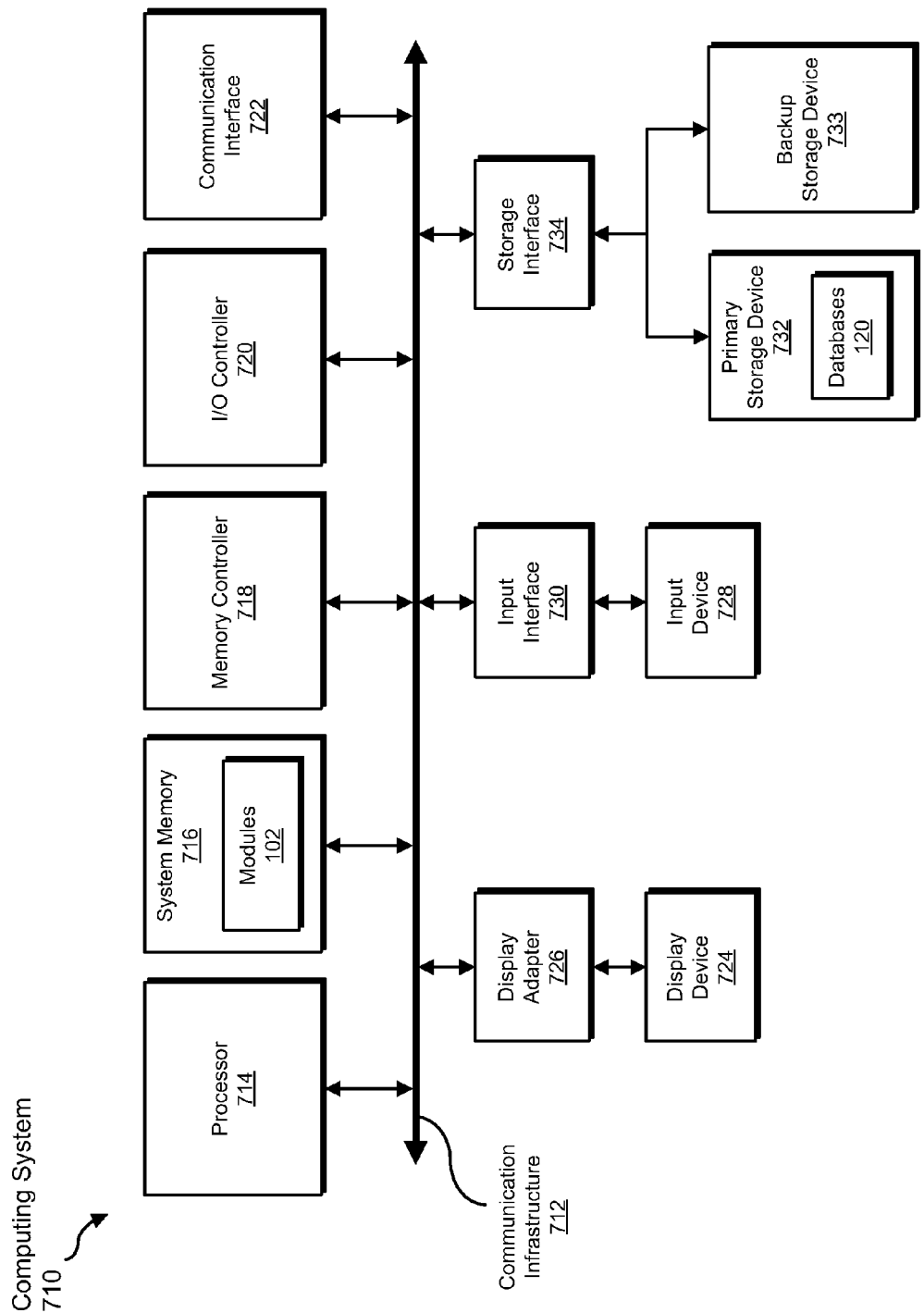
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, determining, using, implementing, translating, tracking, receiving, moving, and providing described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as identifying, determining, using, implementing, translating, tracking, receiving, moving, and providing.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, determining, using, implementing, translating, tracking, receiving, moving, and providing steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, determining, using, implementing, translating, tracking, receiving, moving, and providing steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, determining, using, implementing, translating, tracking, receiving, moving, and providing steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, databases 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, determining, using, implementing, translating, tracking, receiving, moving, and providing steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
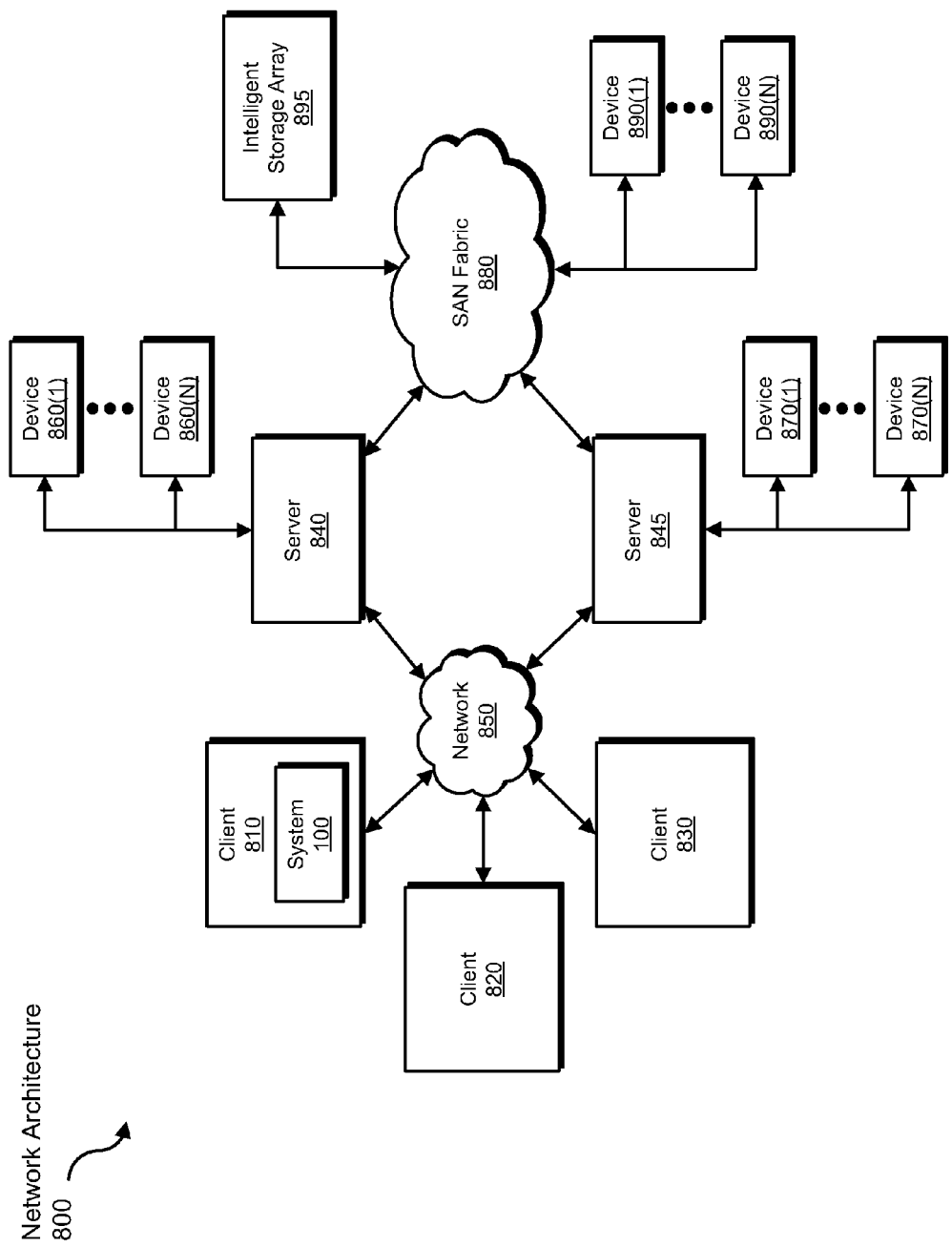
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860 (1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, determining, using, implementing, translating, tracking, receiving, moving, and providing steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for managing portions of files in multi-tier storage systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, one or more of the module described herein may transform a multi-tier storage system into a system capable of storing portions of files on different quality of service storage tiers.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing portions of files in multi-tier storage systems, at least a portion of the method being performed by a computing device comprising at least one processor, the method comprising:
    identifying a file that is managed by an application and stored in a multi-tier storage system, wherein the application comprises a database application and a first portion of the file comprises a database extent of the file;
    determining how the application stores data in the file by analyzing the file to determine how the file is sub-divided and how the database application writes to the file to identify data-management information associated with the application;
    using the data-management information to identify the first portion of the file;
    identifying a data-placement policy;
    implementing the data-placement policy by moving the first portion of the file from a first tier of the multi-tier storage system to a second tier of the multi-tier storage system, wherein moving the first portion of the file comprises translating the database extent to file system blocks offset and length pairs and using the file system blocks offset and length pairs to move file system blocks of the database extent.

2. The method of claim 1, wherein:
analyzing the file to determine how the file is sub-divided and how the database application writes to the file comprises analyzing the file to determine that the database application breaks data up within the file into database extents.

3. The method of claim 1, wherein:
the database extent comprises data of a database table space;
database extents of the database table space are stored in a plurality of files.

4. The method of claim 1, wherein the database extent comprises a contiguous area of storage within the multi-tier storage system.

5. The method of claim 1, wherein:
the data-placement policy indicates that the first portion of the file has higher priority than a second portion of the file;
the second tier of the multi-tier storage system provides a higher quality of service than the first tier of the multi-tier storage system.

6. The method of claim 5, further comprising:
determining that the first portion of the file has higher priority than the second portion of the file by:
tracking input-output activity of the first portion of the file;
tracking input-output activity of the second portion of the file;
determining that the input-output activity of the first portion of the file is higher than the input-output activity of the second portion of the file.

7. The method of claim 1, wherein:
the data-management information indicates a manner in which the application stores data within the file.

8. The method of claim 1, further comprising tracking input-output activity of the first portion of the file, wherein:
the data-placement policy comprises an input-output threshold;
implementing the data-placement policy comprises:
determining that the input-output activity of the first portion of the file exceeds the input-output threshold;
moving the first portion of the file in response to the determination that the input-output activity of the first portion of the file exceeds the input-output threshold.

9. The method of claim 8, further comprising:
providing a report of the input-output activity of the first portion of the file;
using the report of the input-output activity to set the input-output threshold.

10. The method of claim 1, further comprising tracking input-output activity of the first portion of the file, wherein:
the first portion of the file comprises the database extent of the file;
the input-output activity of the first portion of the file is associated with start and offset information that identify the first portion of the file.

11. The method of claim 1, wherein:
the file comprises data of a call detail record table;
the call detail record table is partitioned;
moving the first portion of the file comprises moving a partition of the call detail record table from the first tier of the multi-tier storage system to the second tier of the multi-tier storage system.

12. The method of claim 1, wherein:
the first portion of the file comprises a database extent of a call detail record table;
moving the first portion of the file comprises:
using database extent and segment dictionary tables to generate file, offset, and length information of the database extent of the call detail record table;
using the file, offset, and length information to move the first portion of the file from the first tier of the multi-tier storage system to the second tier of the multi-tier storage system.

13. The method of claim 1, wherein:
the multi-tier storage system comprises a multi-device file system;
the multi-device file system abstracts a set of volumes as a single device;
the first tier of the multi-tier storage system comprises a first subset of volumes from the set of volumes;
the second tier of the multi-tier storage system comprises a second subset of volumes from the set of volumes.

14. A system for managing portions of files in multi-tier storage systems, the system comprising:
at least one processor;
a multi-tier storage system;
an identification module programmed to:
direct the processor to identify a file that is managed by an application and stored in the multi-tier storage system, wherein the application comprises a database application and a first portion of the file comprises a database extent of the file;
direct the processor to determine how the application stores data in the file by analyzing the file to determine how the file is sub-divided and how the database application writes to the file to identify data-management information associated with the application;
use the data-management information to identify the first portion of the file;
a relocation module programmed to:
identify a data-placement policy;
implement the data-placement policy by moving the first portion of the file from a first tier of the multi-tier storage system to a second tier of the multi-tier storage system, wherein moving the first portion of the file comprises translating the database extent to file system blocks offset and length pairs and using the file system blocks offset and length pairs to move file system blocks of the database extent.

15. The system of claim 14, wherein:
the database extent comprises data of a database table space;
database extents of the database table space are stored in a plurality of files.

16. The system of claim 14, wherein:
the data-placement policy indicates that the first portion of the file has higher priority than a second portion of the file;
the second tier of the multi-tier storage system provides a higher quality of service than the first tier of the multi-tier storage system.

17. The system of claim 14, further comprising:
a tracking module programmed to track input-output activity of the first portion of the file.

18. The system of claim 17, wherein:
the data-placement policy comprises an input-output threshold;

implementing the data-placement policy comprises:
    determining that the input-output activity of the first portion of the file exceeds the input-output threshold;
    moving the first portion of the file in response to the determination that the input-output activity of the first portion of the file exceeds the input-output threshold.

19. The system of claim 14, wherein:
the identification module is programmed to determine how the application stores data in the file by
    identifying, among a plurality of different applications, which application manages the file.

20. A computer-readable-storage medium comprising one or more computer-executable instructions that, when executed by a computing device, cause the computing device to:
    identify a file that is managed by an application and stored in a multi-tier storage system, wherein the application comprises a database application and a first portion of the file comprises a database extent of the file;
    determine how the application stores data in the file by analyzing the file to determine how the file is sub-divided and how the database application writes to the file to identify data-management information associated with the application;
    use the data-management information to identify the first portion of the file;
    identify a data-placement policy;
    implement the data-placement policy by moving the first portion of the file from a first tier of the multi-tier storage system to a second tier of the multi-tier storage system, wherein moving the first portion of the file comprises translating the database extent to file system blocks offset and length pairs and using the file system blocks offset and length pairs to move file system blocks of the database extent.

* * * * *